Dec. 4, 1956  R. E. HARRINGTON  2,772,549
SAFETY-SHIELDED POWER-TRANSMITTING ASSEMBLY
Filed Jan. 20, 1955
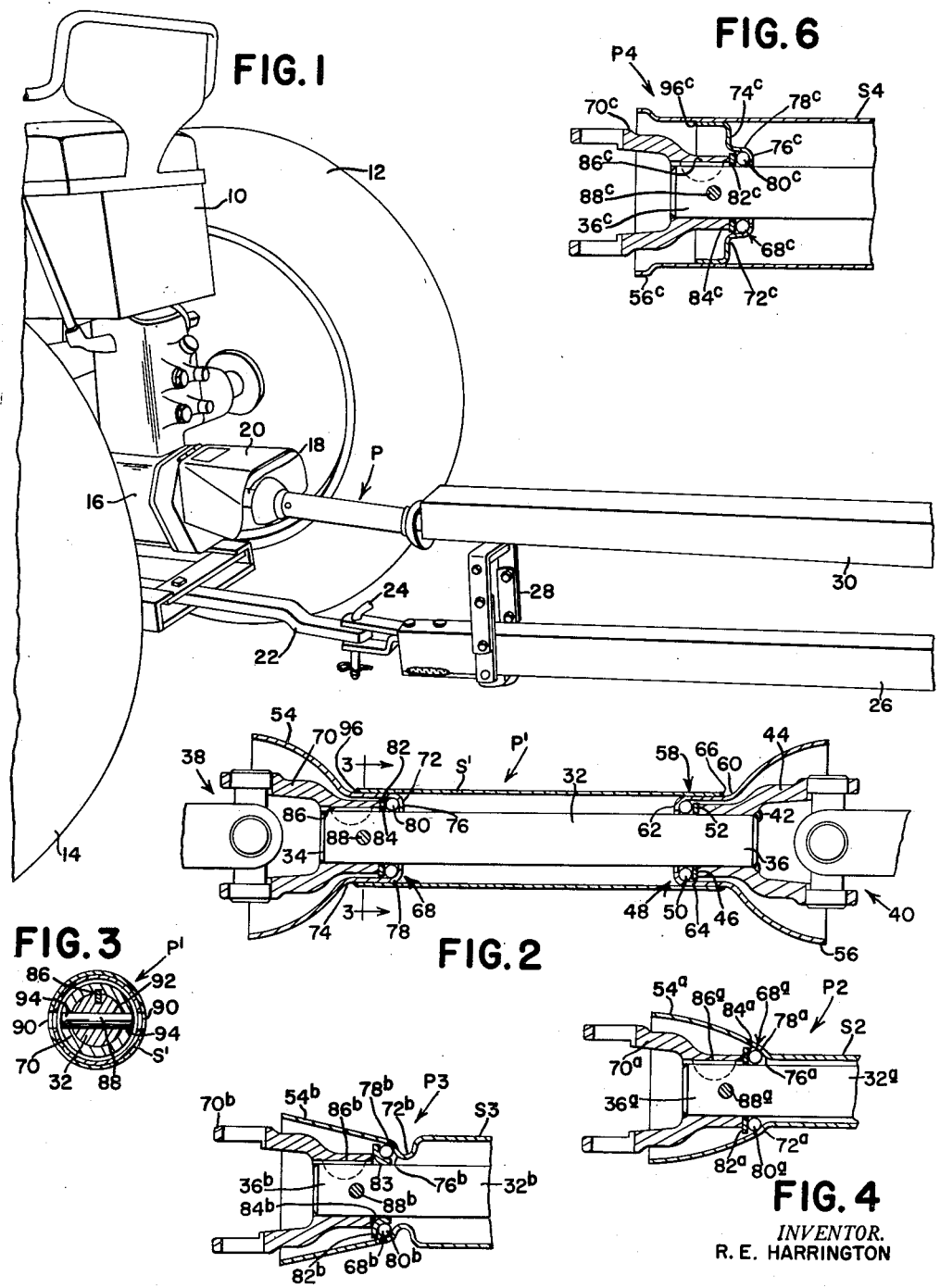
INVENTOR.
R. E. HARRINGTON

United States Patent Office 2,772,549
Patented Dec. 4, 1956

2,772,549

SAFETY-SHIELDED POWER-TRANSMITTING ASSEMBLY

Roy E. Harrington, Moline, Ill., assignor to Deere & Company, Moline, Ill., a corporation of Illinois Application January 20, 1955, Serial No. 483,125

10 Claims. (Cl. 64—4)

This invention relates to safety shielding for power-transmitting assemblies and particularly to such shielding for use in propeller shafts as used in the connection of agricultural implements to tractors.

An agricultural tractor is conventionally equipped with a rearwardly projecting power take-off shaft from which power is taken by a propeller shaft to an implement towed and powered by the tractor. It has been long recognized that the exposed propeller shaft is a hazard to the operator and various types of safety shields have been developed for use in protecting the operator against these hazards. There are, however, various design characteristics that hamper somewhat the development of a suitable shield for use in all cases. For example, when the implement is connected to or disconnected from the tractor it is necessary to connect and disconnect the propeller shaft relative to the power take-off shaft. If the shield is permanently attached in such a manner as to interfere with the manipulation of the various connections, then the operator is apt to discard the shield. If the shield is made too easily removable, the operator is likely to forget to reinstall it and the hazard is recreated. In some instances shielding has been provided that bridges the gap between the tongue of the towed implement and the tractor, but in these cases the shield must be articulate as well as at least partially removable to accommodate the articulate connection between the tractor and the implement and to facilitate connection and disconnection of the tongue and power shaft.

It has been a characteristic of recent designs to provide a shield that is carried directly on the intermediate portion of the power shaft in such manner that the shield is journaled on the shaft. Normally, the friction between the shield and the shaft will cause the shield to rotate but if the operator should inadvertently contact the shield, it cannot rotate and therefore cannot wrap into his clothing or otherwise injure him. Shields of this character have proven fairly desirable to both the manufacturer and the user, but a few minor problems remain to be solved; namely, provision for relative permanence of the shield but including also provision for removing the shield in the event that it is desired to service or replace any or all of the parts because of wear or damage; and various problems incident to economical manufacture and ease of maintenance.

The present invention features a basic design incorporating several advantages, particularly in connection with an intermediate propeller shaft of fixed length, on which is appropriately journaled a safety shield that is non-removable axially except upon removal of one of the universal joint yokes. The shield provides means for access to a removable connecting pin whereby the yoke may be removed so that the shield may be removed. At the same time, for all practical purposes the shield is non-removable, especially in operation. The design is such that there is adequate allowance made for facilitating connection and disconnection of the shaft assembly without any need at all for removing the shield, thereby eliminating the likelihood that the operator will consider the shield a nuisance.

The foregoing and other important objects and desirable features inherent in and encompassed by the invention will become apparent as several embodiments of the invention are disclosed in detail in the ensuing specification and accompanying sheet of drawings, the several figures of which will be described immediately below.

Fig. 1 is a fragmentary perspective view showing a tractor and implement environment in which the safety shield finds its greatest utility.

Fig. 2 is a longitudinal sectional view of the intermediate power-transmitting assembly of Fig. 1.

Fig. 3 is a transverse sectional view as seen along the line 3—3 of Fig. 2.

Fig. 4 is a fragmentary sectional view of a modified form of the structure shown in Fig. 2.

Fig. 5 is a fragmentary sectional view of a third modified form.

Fig. 6 is a fragmentary sectional view of a fourth modified form.

In the following description, the environment illustrated in Fig. 1 is to be taken as representative of all forms of the invention. For that purpose, the structure in Fig. 1 will be described only generally.

As illustrated in that figure, the left-hand portion of the illustration represents the rear portion of a conventional agricultural tractor as having a main body 10 supported between right- and left-hand traction wheels 12 and 14 and including a rear power take-off housing 16 from which a power take-off shaft 18 projects rearwardly in the conventional manner. The tractor is equipped with a power take-off shield of the general type shown in the U. S. patent to Tinsler et al. 2,413,266, which shield is here designated by the numeral 20. As will be understood, the shield 20 is designed so as to expose enough of the power take-off shaft to enable connection thereto of an intermediate propeller shaft or power-transmitting assembly designated generally by the letter P, the details of which will be discussed separately in connection with the various forms of the invention.

The tractor has a rearwardly extending drawbar 22 to which is pivotally connected by a pin 24 the forward end of an implement tongue 26. Supported on the implement by means of an upright forward bracket 28 is a forwardly extending tube 30 within which is an implement input shaft (not shown). The assembly P is utilized to articulately interconnect the power take-off shaft 18 and the implement input shaft. As will appear below, the assembly P includes an internal shaft and a pair of universal joints to accommodate relative movement between the tractor and implement which occurs because of the articulate connection at 22—24—26. It will be further apparent that when the tractor and implement are operated as a unit the propeller shaft that extends between the power take-off shaft 18 and the implement input shaft would, if not shielded, be exposed and would therefore constitute a hazard to the operator. Although an operator mounted on the tractor seat would be clear of any danger because of such propeller shaft, it should be understood that, for reasons not important here, the operator and others working with him do not always remain in positions remote from the propeller shaft.

In that form of the invention shown in Figs. 2 and 3, the assembly corresponding to the assembly P in Fig. 1 is designated by the legend P¹.

This assembly comprises a shaft 32 of fixed length, having a front end 34 and a rear end 36. Here, as in the claims, the expressions "front" and "rear" are used in the interests of clarity, and the shaft could as well be changed end for end without departing from the spirit and scope of the invention. Accordingly, the disclosure should be taken as illustrative and not limiting. The front end of the shaft 32 is connectible to the tractor power take-off shaft 18 via a universal joint and coupling assembly 38. A similar joint 40 affords a means for connecting the rear end of the shaft to the implement input shaft.

As an expedient to simplicity and economy in manufacture, the rear end 36 of the shaft may be permanently fixed, as by welding at 42, to a rear yoke 44 which is part of the rear joint assembly 40. The rear joint member is thus non-removable as respects the shaft 32. This joint member has a front radial face 46 against which seats or thrusts an axially forwardly removable rear bearing means 48. This bearing means, in the form of invention being now described, comprises a plurality of rolling elements, here in the form of balls 50 which encircle the proximate portion of the shaft 32 in radial-load-contact relation. That is to say, the balls run on the shaft and are independent of the joint member 44. The balls are separated from the radial face 46 of the joint member by a hardened thrust washer 52. Because the joint member 44 is of larger diameter than the shaft 32, it affords a rear stop or abutment and all components of the assembly, apart from the shaft 32 and the joint member 44, are axially forwardly removable and are axially rearwardly installable, the details of which will presently appear.

An axially forwardly removable cylindrical safety tube $S^1$ loosely and concentrically surrounds the shaft and has front and rear end portions 54 and 56, respectively, proximate respectively to the front and rear ends 34 and 36 of the shaft. In the case of the assembly $P^1$, the ends 54 and 56 are bell shaped to at least partially enclose, respectively, the front and rear universal joints 38 and 40.

The rear end of the tube $S^1$ has race means 58 cooperative with the rear bearing means 48 to journal the tube on the shaft and to restrain the tube against rearward axial shifting after it is in place. The rear race means includes a cup shaped portion 60 which, in the assembly $P^1$, forms part of the rear end bell 56 of the safety tube $S^1$. This cup shaped portion thus affords a radial thrust ring 62 and an adjacent radial-load ring 64. The thrust ring 62 thrusts against the balls 50 and the radial-load ring surrounds and rides on the balls to journal the rear end of the safety tube. In the assembly $P^1$, the rear end 56 is rigidly secured to the safety tube $S^1$ as by welding, indicated here generally by the numeral 66.

In the assembling of the shaft and shield unit $P^1$, the thrust washer 52 may be slid endwise onto the shaft until it abuts the front face 46 of the rear joint member 44. The shaft may then be inserted, front end first, through the central opening in the thrust ring 62, after which the balls 50 may be dropped into place and the race means ultimately seated on the bearing. There remains for completion only the installation of front bearing means 68 and a front joint member 70 that forms part of the front universal joint 38. As will appear below, the front joint member is removably connected to the front end 34 of the shaft 32 so that assembly of the bearings 48 and 68 may be readily accomplished.

The front bearing means is accommodated by race means 72 which comprises part of a cup shaped portion 74, here the integral rear part of the front bell 54. The cup shaped portion 74 affords a radial thrust ring 76 and an adjacent radial-load ring 78, both of which are rearwardly of the front end 34 of the shaft 32. The bearing means 68 includes a plurality of rolling elements such as balls 80 which are in radial-load contact with the radial-load ring 78 and with the surface of the shaft 32 and which thrust against the thrust ring 76. A thrust washer 82 is interposed between the balls 80 and a rear radial face 84 on the rear end of the front joint member 70.

The front end of the shaft is keyed to the front joint member 70, as by a key 86, and in addition is secured to the joint member by releasable securing means in the form of a radially insertable and withdrawable locking pin 88. As best shown in Fig. 3, the front end portion of the safety tube $S^1$ is diametrically apertured at 90 to permit access to the pin 88. In order to accommodate the pin 88, the shaft 32 has a transverse or diametral aperture or bore 92 and the joint member or yoke 70 has registering apertures 94. In the assembly of the unit $P^1$, after the rear part of the assembly has been accomplished, the balls 80 are dropped into place, followed by the thrust washer 84 and the front joint member or yoke 70. The apertures 90, 92 and 94 are then registered or transversely alined and the pin 88 is inserted through the tube aperture 90 to enter the registered apertures in the shaft and joint member. The pin may be of any suitable drive type. Of course, during operation, misalinement of the apertures as between the tube and the assembled shaft and yoke will occur but that is obviously immaterial. When it is desired to disassemble the unit, realinement of the necessary apertures is accomplished and the pin 88 may be driven out. Such disassembly may be required in the event of wear or damage to the shaft or shielding, either of which may be replaced. During operation the disassembly will not naturally occur and it is expected that it will not occur inadvertently. At the same time, the unit $P^1$ is readily handled and connection and disconnection may be readily effected without the unit characterizing itself as a nuisance to the user. Because of the journaling of the safety tube $S^1$ on the shaft assembly by means of the bearings 48 and 68, the shield, if rotating, will stop and there is no shaft-to-tube transmission of torque in the event that a person comes into contact with it. The front bell 54 is welded to the front end of the tube $S^1$, as at 96.

In this form of the invention, as well as in those to be described below, the rear bearing means may be other than as described, the important thing being that the assembly of the tube $S^1$ on the shaft is readily accomplished by rear journaling means that establishes an abutment limiting rearward axial displacement of the tube relative to the shaft and at the same time affording a removable front joint by means of which the front bearing assembly may be first accomplished and then followed by securing of the front joint to the front end of the shaft. The converse is also true; that is, the important thing is the expedient removal of the front joint without requiring disassembly of both ends of the unit. As already indicated, the ends of the unit are interchangeable in use between the power take-off shaft 18 and the implement input shaft and the expressions "front" and "rear" are merely representative.

The assembly or unit $P^2$ shown in Fig. 4 is in many respects similar to the assembly $P^1$. Accordingly, the description thereof will be brief as to points of similarity, and elaboration will be indulged only at essential points of difference. In the interests of clarity, the assembly $P^2$ will use reference characters of the assembly $P^1$ but followed by the exponent $a$. It will be understood, of course, that only the "front" end of the assembly is shown.

On the basis of the foregoing, the assembly $P^2$ includes a shaft 32$a$ to the front end of which is removably secured a front joint member 70$a$ by means of a key 86$a$ and removable pins 88$a$. In this case, the front bell 54$a$ is formed as an integral part of the safety tube $S^2$. It will be understood that the tube is apertured as at 90 in Fig. 3 to permit the insertion and withdrawal of the pin 88$a$.

The bearing means 68$a$ includes balls 80$a$ and a thrust washer 82$a$ interposed between the balls and the rear radial face 84$a$ of the joint member 70$a$. The front race means 72$a$ is, in the assembly $P^2$, an integral part of the tube $S^2$, being rolled in to establish an annular bead which has a wall portion affording the thrust ring 76$a$, the junction of the bead with the bell 54$a$ affording the radial-load ring 78$a$. Here, as in the case of the assembly P¹, the radial load as between the shaft 32a and the tube S² is taken directly on the shaft 32a and thrust is taken against the front joint member 70a. It is understood, of course, that the rear end of the assembly may be similar to that described or may be fashioned in any manner establishing a rear journal and stop. Other characteristics of the design are similar to those already described in connection with the assembly P¹.

The unit P³ will follow the reference character pattern indicated above. In this case, the safety tube S³ is journaled on the shaft 32b by means of a bearing 68b of the type including a plurality of rolling elements or balls 80b. The same characteristics of removable connection of the front joint member 70b to the shaft 32b are accomplished by a key 86b and a removable pin 88b, it again being understood that the tube S³ has an appropriate aperture providing access to the pin 88b. As in the case of the assembly P², the race means 72b is an integral part of the tube, being rolled in to provide a bead of which the annular wall provides the thrust ring 76b and the junction between the bead and the bell 54b provides the radial-load ring 78b. In this case, the front thrust washer 82b has an integral ring or collar 83b which receives the balls 80b. Thus, the collar is interposed between the set of balls and the shaft. Nevertheless, the bearing means is independent of the front joint member 70b. Other essential features of the design are similar to those previously described.

The description of the assembly P⁴ will follow the pattern designated above. In this case, the safety tube S⁴ has an internal cup 74c which is rigidly secured, as by welding at 96c to the tube. This cup shaped portion 74c affords a front thrust ring 76c and a radial-load ring 78c, both of which cooperate with the balls 80c of the bearing 68c in a manner obvious from the description of the assemblies P¹, P², and P³. A thrust washer 82c is interposed between the rear radial face 84c of the front joint member 70c. A key 86c and a removable pin 88c function as before in the removable connection between the shaft and the front joint member. The front end of the tube S⁴ is slightly bell shaped at 56c for purposes already described. Other features of the invention will be apparent from the preceding description of the other units. The cup shaped portion 74c affords, of course, the front race means 72c.

Various features not categorically enumerated herein will undoubtedly occur to those versed in the art, as likewise will further variations in the forms of the invention apart from those illustrated, all of which may be accomplished without departing from the spirit and scope of the invention.

What is claimed is:

1. A safety-shielded power-transmitting assembly of the character described, comprising: a shaft of fixed length having front and rear ends; a rear joint member fixed to said rear end and having a front radial face; axially forwardly removable rear bearing means encircling and supported on the shaft ahead of and thrusting rearwardly against said front radial face; an axially forwardly removable safety tube loosely and concentrically surrounding the shaft and having front and rear ends respectively proximate to the front and rear ends of the shaft; rear race means on the rear end of the tube and including a rear thrust ring thrusting rearwardly against the rear bearing means and an adjacent rear radial-load ring received by said rear bearing means to journal the rear end of the tube; front race means on the front end of the tube and including a forwardly facing front thrust ring and an adjacent front radial load-ring loosely encircling the front end of the shaft; front bearing means encircling and supported on the front end of the shaft for free axially slidable removal from the shaft in a forward direction and normally thrusting rearwardly against the front thrust ring and received by the front radial-load ring to journal the front end of the tube; a front joint member axially forwardly removably received by the front end of the shaft and having a rear radial face thrusting rearwardly against the front bearing means and directly holding said front bearing means against forward axial removal from the shaft; and means removably cooperative between the front joint member and the front end of the shaft for releasably securing said front joint member to the shaft.

2. The invention defined in claim 1, in which: the front end of the tube projects axially forwardly to enclose at least a portion of the front joint member; the releasable securing means between the front end of the shaft and the front joint member includes registering transverse apertures in the enclosed portion of the front joint member and the proximate part of the front end of the shaft and a pin radially insertable in and withdrawable from said apertures; and the forwardly projecting end of the tube has an access opening therein radially alinable with said apertures to afford access to the pin.

3. The invention defined in claim 1, in which: the front race means includes an internal annular bead integral with the front end of the tube, said bead having a generally radial wall portion affording the front thrust ring and the junction between the bead and the proximate part of the tube affording the radial-load ring.

4. The invention defined in claim 1, in which: the front race means includes a forwardly facing cup-shaped member having internally within the front end of the tube and fixed thereto a radial flange affording the thrust ring and a circumferential flange integral with the radial flange and affording the radial load ring.

5. The invention defined in claim 4, in which: the circumferential flange projects axially ahead of the front end of the shaft and at least partially encloses the front joint member.

6. The invention defined in claim 1, in which: the front bearing means includes a plurality of rolling elements directly contacting the shaft for radial-load support independently of the front joint member.

7. The invention defined in claim 1, in which: the front bearing means includes a plurality of rolling elements having inner points of contact on a circle larger than the shaft to afford an annular space, and said front bearing means further includes an inner race having a collar part encircling the shift and filling said space.

8. The invention defined in claim 7, in which: the inner race further includes a radial flange interposed between the front rolling elements and the rear radial face of the front joint member.

9. A safety-shielded power-transmitting assembly of the character described, comprising: a shaft of fixed length having front and rear ends; a rear joint member fixed to said rear end and being of larger diameter than said rear end so as to afford a rear abutment; an axially forwardly removable safety tube loosely and concentrically surrounding the shaft and having a rear end abutting the rear joint member to establish a rear limit on axial rearward movement of said tube, said tube further having a front end proximate to but axially short of the front end of the shaft; race means on the front end of the tube and including a forwardly facing thrust ring and an adjacent radial-load ring loosely encircling the front end of the shaft; bearing means encircling and supported on the front end of the shaft for free axially slidable removal from the shaft in a forward direction and normally thrusting rearwardly against the thrust ring and received by the radial-load ring to journal the front end of the tube; a front joint member axially forwardly removably received by the front end of the shaft and having a rear radial face thrusting rearwardly against the bearing means and directly holding said front bearing means against forward axial removal from the shaft; and means removably cooperative between the front joint member and the front end of the shaft for releasably securing said front joint member to the shaft.

10. The invention defined in claim 9, in which: the bearing means includes a plurality of rolling elements directly contacting the shaft for radial-load support independently of the front joint member.

References Cited in the file of this patent
UNITED STATES PATENTS 1,024,132    Heaslet _____ Apr. 23, 1912